Nov. 21, 1967 R. W. REICH 3,354,329
MAGNET ARRANGEMENT FOR ELECTRIC AND ELECTRONIC CLOCKS
Filed Jan. 14, 1964 2 Sheets-Sheet 1
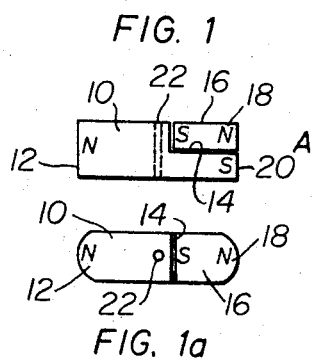
FIG. 1
FIG. 1a
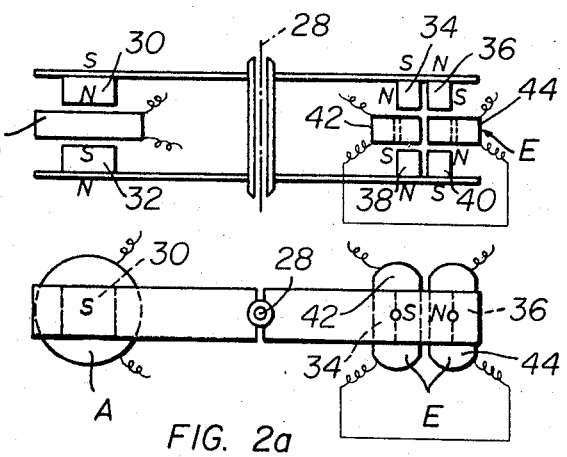
FIG. 2
FIG. 2a
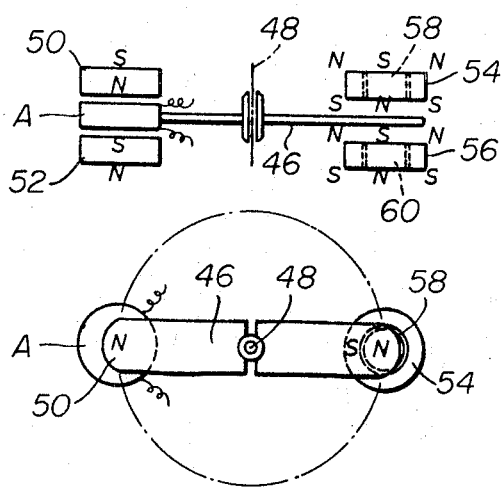
FIG. 3
FIG. 3a
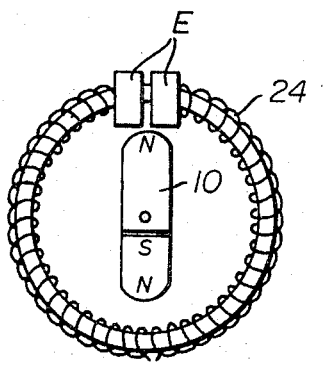
FIG. 4
Inventor
ROBERT WALTER REICH
By Toulmin & Toulmin
Attorneys Nov. 21, 1967   R. W. REICH   3,354,329
MAGNET ARRANGEMENT FOR ELECTRIC AND ELECTRONIC CLOCKS
Filed Jan. 14, 1964   2 Sheets-Sheet 2
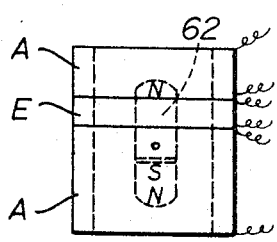
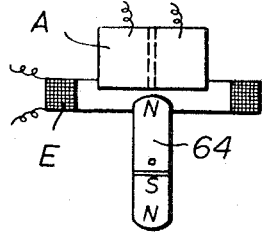
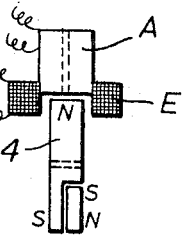
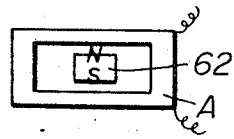
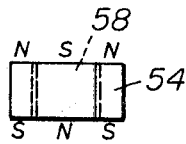
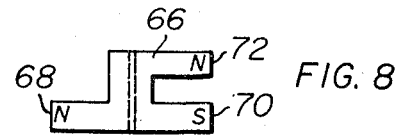
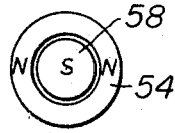
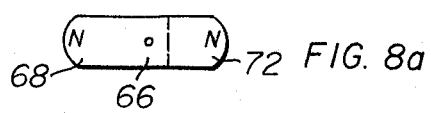
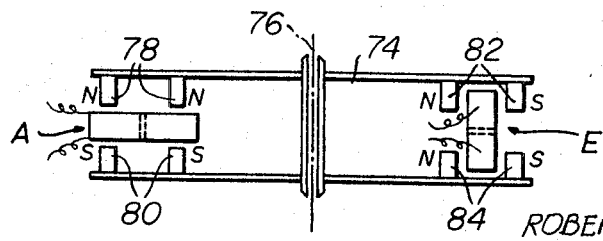
Inventor
ROBERT WALTER REICH
By Toulmin & Toulmin
Attorneys

United States Patent Office 3,354,329
Patented Nov. 21, 1967

3,354,329
MAGNET ARRANGEMENT FOR ELECTRIC AND ELECTRONIC CLOCKS
Robert Walter Reich, Merzhauserstr. 143, Freiburg im Breisgau, Germany
Filed Jan. 14, 1964, Ser. No. 337,597
10 Claims. (Cl. 310—36)

This invention relates to electrically operable clock mechanisms, and in particular, to such mechanisms wherein a balance wheel is employed which operates to control the release of power to a coil which acts upon the balance wheel to keep it in motion. With such clock mechanisms, magnets are often mounted on the balance wheel for cooperation with stationary coils mounted adjacent to the balance wheel, or coils are mounted on the balance wheel and magnets are stationarily mounted adjacent the balance wheel. When the balance wheel moves, the coil and magnet are brought into cooperative relation to develop an excitation impulse to a transistor amplifier circuit which will then release power to a driver coil for driving the balance wheel.

With arrangements known heretofore, however, there have been certain difficulties, particularly in connection with controlling the amount of swing of the balance wheel. For example, if the magnet runs clear across the balance wheel, an impulse will be developed for every 180 degrees of revolution of the balance wheel. This imposes a severe limit on the amount of oscillation of the balance wheel that can be permitted.

To avoid this difficulty, one-sided arrangements of coils and magnets have been made and it was then necessary to provide counterbalances on the other side of the balance wheel, making the balance wheel heavy and sometimes making the clock mechanism sensitive to the position which it occupied.

In any arrangement where impulses occur every 180 degrees, an over-swinging of the balance wheel can occur which requires extra mechanism and the like to counteract this over-travel.

If the impulse is outside the null position, for example, after 90 degrees, then the serious difficulty arises of having both impulses, which are 180 degrees apart outside the null positions, and this will further tend to destroy synchronism.

The disadvantages referred to above have resulted in only a relatively few electronic clock arrangements with magnetically excited circuits. All previous systems have used one-sided magnetic arrangements with counterweights, and this has resulted in low efficiency and the other draw-backs referred to above. The low efficiency is particularly noticeable in battery economy in battery operated clock mechanisms. A still further disadvantage is that only small amplitudes can be employed, whereas for maintaining synchronism, amplitudes on the order of 220 degrees are necessary. All electronic systems using transistors are sensitive to voltages and temperatures, and the amplitude of the balance wheel will also depend on the battery voltage. Thus, if amplitudes on the order of 270 to 300 degrees of the balance wheel could be produced with maximum battery voltage, even then with reduced battery voltage, it might still be possible to maintain an amplitude of over 220 degrees so that synchronism could be maintained.

Because of the difficulties arising with the larger amplitudes, it has not been possible to use them and it has, therefore, become customary to use batteries for limited periods, and the batteries are discarded when they still have a great deal of useful life yet remaining in them.

The present invention proposes to overcome the foregoing difficulties by an improved magnet arrangement in which one pole of the magnet is ineffective for developing an excitation impulse so that the swing of the balance wheel does not have to be reduced to prevent a double excitation impulse during a single oscillation of the balance wheel.

More specifically, the present invention proposes the neutralization of one pole of the magnet to make it ineffective with respect to the excitation coil so that the neutralized pole can swing past the excitation coil without developing an impulse therein.

This invention further proposes the provision of an electronic clock work arrangement having a magnet on the balance wheel in which a one-sided magnet arrangement is provided but without requiring counterbalances and the like on the balance wheel. Still further, the present invention proposes the provision of a magnet arrangement on a balance wheel of an electronic clock work arrangement in which the magnet is so constructed and arranged that one end thereof is effective only in connection with the excitation coil, whereas the other end is effective only in connection with a driver coil arrangement.

The objectives of the present invention are realized by so forming the magnet carried by the balance wheel that the magnet at one side of the balance wheel is subdivided so as to have two poles of opposite polarity while the magnet to the other side is not so subdivided, and with the coil arrangements pertaining to the respective magnet ends being subdivided for cooperation with the divided pole end and the other coil being in the form of a single coil to cooperate with the undivided magnet end.

Either end of the magnet could develop the excitation impulse in its pertaining coil and the other end could receive the drive impulse from a drive coil. In any case, however, each end of the magnet is effective only in connection with its pertaining coil and is totally ineffective with respect to the other coil even though it sweeps by this coil during operation of the clock work.

As a particular example of advantages to be realized by the practice of the present invention, a known clock construction utilizing a coil current of 200 microamperes and having limited amplitude of the balance wheel was reconstructed according to the present invention, and it was then found that the current consumption diminished to 50 microamperes while the amplitude of the balance wheel was increased to 270 degrees.

It will be appreciated that the balance wheel referred to is a periodically oscillating element that sets the time characteristics of the clock work and that this element could comprise a conventional balance wheel such as are utilized in watches, or it could constitute a pendulum arrangement as might be employed in a larger clock. In either case, the element oscillates and therefore can influence an excitation coil and a driver coil whereby the element is maintained in a condition of oscillation.

The exact nature of the present invention will become more apparent upon reference to the following specification taken in connection with the accompanying drawings, in which:

FIGURE 1 shows in side elevation a magnet constructed according to the present invention;

FIGURE 1a is a plan view looking down on top of the magnet of FIGURE 1;

FIGURE 2 is a view showing a balance wheel having a somewhat different magnet arrangement in which individual magnet elements are disposed so as to be undivided at one side of the balance wheel and divided in the other side thereof;

FIGURE 2a is a plan view of the arrangement of FIGURE 2;

FIGURE 3 is a view similar to FIGURE 2 but shows an arrangement wherein the magnets are stationarily mounted adjacent the oscillating element and the coil means are carried on the element;

FIGURE 3a is a plan view of the arrangement of FIGURE 3;

FIGURE 4 is a view showing a toroidal coil arrangement;

FIGURE 5 is a view showing the magnet according to the present invention oscillatable within stacked impulse and driver coils;

FIGURE 5a is a plan view of the FIG. 5 modification;

FIGURE 6 is a view showing a different arrangement of the excitation and driver coils;

FIGURE 6a is a side view of the FIGURE 6 arrangement;

FIGURE 7 shows a manner of arranging magnetic elements telescopically similarly to the magnet elements at the right side of FIGURE 3;

FIGURE 7a is a plan view of the magnet arrangement of FIGURE 7;

FIGURE 8 shows a magnet structure for a divided pole at one end but made as a single member;

FIGURE 8a is a plan view of the magnet of FIGURE 8, and

FIGURE 9 is a diagrammatic view showing the magnets arranged on a balance wheel to co-act with a driver coil having its axis extending in one direction and an excitation coil having its axis extending at right angles to the axis of the driver coil.

In the drawings, FIGURE 1 shows a magnet member 10 having a north pole 12 at one end and having a notch 14 formed in the other end. Disposed in notch 14 is a magnet element 16 having its north pole 18 adjacent south pole 20 of magnet 10 so as to neutralize the south magnet with respect to influencing a coil past which this magnet end would go when the magnet oscillated about its axis 22. A magnet of this nature could be employed, for example, in the FIGURE 4 arrangement which shows the magnet inside the toroidal coil arrangement 24 known per se.

FIGURE 2 shows a construction wherein balance wheel 26 oscillatable on axis 28, has magnet elements 30 and 32 at one side establishing a single unidirectional magnetic axis in respect of stationary coil A, which may be a drive coil or an excitation coil. This coil is a single coil with its axis coinciding with the magnetic axis established by magnets 30 and 32 and thus will be influenced by the magnet elements 30 and 32 as the balance wheel oscillates.

On the side of the wheel opposite magnets 30 and 32 the balance wheel carries magnet elements 34 and 36 on one side and 38 and 40 on the other side so arranged as to establish two magnetic axes of respectively opposite directions through the respective individual portions 42 and 44 of coil means E which again may be either driver coil means or excitation coil means. It is understood that, in accordance with well known electrical principles, coils 42 and 44 are so connected in series that the voltages induced therein by magnet elements 34, 36, 38, and 40 are additives. The polarity of the magnetic elements is as is indicated, and it will be evident that these last mentioned magnetic elements will not link with and thus will have no influence whatsoever on coil A when the balance wheel oscillates, whereas magnetic elements 30, 32 will have no effect on the coil elements 42, 44 when these elements are connected in series as above noted.

In FIGURE 3, balance wheel 46, oscillatable on axis 48, has positioned adjacent thereto at one side magnet elements 50 and 52 with the polarity as indicated which would establish a magnetic axis effective on a coil means A carried by the balance wheel in the same manner as described in connection with FIGURE 2.

At the opposite side of the balance wheel, however, the magnet elements are so arranged that the coil means A would be insensitive to the magnetic axis established by the telescopic arrangement illustrated, and which consists of an outer ring-like magnet 54 above the balance wheel and 56 below, and the telescopically arranged inner magnets 58 above the balance wheel and 60 below. These magnets and their poles are disposed as indicated in the drawings.

In FIGURE 5 a pendulum-like arrangement is illustrated in which the magnet element 62 corresponds to the magnet element illustrated in FIGURE 1. In this figure the two coils A are disposed on opposite sides of coil E to form a stack of coils with the coil means being sensitive to one end only of the magnet element.

In FIGURES 6 and 6a magnet element 64 again corresponds to the magnet element shown in FIGURES 1 and 1a, and as the magnet element oscillates, the single pole end only is effective in connection with coils E, whereas the divided end is ineffective.

FIGURES 7 and 7a show the magnet arrangement of FIGURES 3 and 3a somewhat more in detail.

In FIGURE 8 the magnet element 66 is in the form of a single integral member, a sintered powdered article for example, wherein a north pole 68 is provided at one end while the opposite end of the magnet is divided into two legs and has a south pole 70 and a north pole 72.

FIGURE 9 shows a balance wheel 74 oscillatable on an axis 76, and at one side having on top the magnet elements 78 and on the bottom the magnet elements 80 which establish a magnetic axis that will influence the coil A which has its axis extending parallel to the axis of oscillation of the balance wheel. These magnets, arranged as shown in FIGURE 9, will however be ineffective in connection with coil E arranged diametrically opposite coil A and having its axis extending at right angles to the axis of coil A.

At the side of the balance wheel opposite the first mentioned magnets there are arranged on one side the magnet elements 82 and on the other side the magnet elements 84, which last-mentioned magnetic elements establish a magnetic axis that will cooperate with coil E as the balance wheel moves, but which will be totally ineffective with respect to coil A.

From the foregoing it will be seen that the present invention provides for a magnet arrangement in which the swing of the oscillating time control element of a clock work is not limited by the magnets and wherein counterbalancing weights to offset the unbalance pertaining to a one-sided magnet are not necessary. Synchronization of the clock work can easily be maintained, the power consumption is diminished over known arrangements, and when a battery is employed as the source of power, the drain on the battery is reduced and the useful life of the battery is greatly extended.

It will be understood that in any of the foregoing arrangements, the point of inaction of the coil means and the magnet means would be about 90 degrees away from the null position of the oscillatable element or at some smaller angle in the case of a pendulum which might swing through only a few degrees. It will also be understood that the excitation coil means and the driver coil means could be independent of each other and spaced apart. For example, the driver coil means could either be at A or E and the other coil means could constitute the excitation coil means. However, it is also contemplated that the driver coil means and excitation coil means could be located at about the same point and both thereof cooperate with one end only of the magnet element. The magnet element of FIGURES 1 and 1a is particularly adapted for this type of operation.

It is also possible to have two each of the driver and excitation coil elements, a pair thereof being positioned at each of two spaced points and each pair cooperating with one end only of the magnet arrangement. In any case, each end of the magnet arrangement is designed to influence the excitation coil means at one position only, or to be influenced by a driver coil means at one position only, or to cooperate with a single excitation-driver coil combination at one point only.

It will further be understood that where two ends of a magnet are referred to, this terminology is also intended to include an arrangement, as shown in FIGURES 2, 3 and 9, for example, where a holder or carrier is provided having magnet elements at the opposite ends and an unmagnetized region therebetween, as in the case of FIGURE 3 where magnet elements are spaced on opposite sides of the axis of rotation or oscillation of the oscillatable member.

In any case, all modifications of the present invention are characterized in the provision of magnet means and coil means arranged for selective cooperation brought about by so arranging the coil means and the poles of the magnet means that at least one pole of the magnet means is ineffective for establishing any linkages with at least some of the coil means.

It will be understood that this invention is susceptible to modifications in order to adapt it to different usages and conditions; and accordingly, it is desired to comprehend such modifications within this invention as may fall within the scope of the appended claims.

I claim:

1. In a drive arrangement for an electric clock; coil means including excitation coil means and driver coil means, respective magnet means for cooperation with respective ones of said coil means, an oscillatory element carrying said magnet means, said coil means being respectively stationarily positioned adjacent the path of movement of the said magnet means on the oscillatory element at points removed from each other 180°, said magnet means presenting to said coil means first and second pole regions spaced 180° apart about the axis of oscillation of said oscillatory member, each said pole region effecting a flux linkage with a respective one only of said coil means in passing thereby.

2. The arrangement according to claim 1 in which said magnet means comprising a bar-like magnet having a single pole of one polarity at one end and having a pair of poles of respectively opposite polarity at the other end.

3. The arrangement according to claim 2 in which said other end of the magnet is notched and a neutralizing magnet is mounted in the notch, said neutralizing magnet having its pole nearest the said other end of said magnet of a polarity opposite that of the said other end of said magnet.

4. The arrangement according to claim 2 in which one of said coil means is a single coil arranged to be linked by magnetic flux from said one end only of said magnet while the other of said coil means is in the form of a double coil with each portion thereof arranged to be linked by magnetic flux from one only of said pair of poles at the other end of said magnet.

5. The arrangement according to claim 2 in which said coil means is located in the region of the positions of the ends of said magnet when said oscillatory member is in its null position.

6. The arrangement according to claim 1 in which said first pole region establishes a single magnetic axis and said second pole region establishes two adjacent respectively oppositely directed magnetic axes, one of said coil means linking only with said single magnetic axis and the other of said coil means linking only with said two axes.

7. In an electric clock; coil means including excitation coil means and driver coil means, magnet means for cooperation with said coil means, an oscillatory element, one of said magnet means and coil means being mounted on said oscillatory element and the other thereof being stationarily positioned adjacent the path of movement of the said means on the oscillatory element, said magnet means having first and second effective regions spaced 180° apart and said regions being so arranged that one only thereof is effective for influencing at least some of said coil means, said coil means including a first coil having an axis extending in one direction and a second coil having an axis extending at right angles to the axis of the first coil and said magnet means in said first and second regions establishing magnetic axes respectively at right angles to each other and each thereof forming linkage with one only of said first and second coils.

8. A magnet for use in an electric clockwork for cooperation with excitation and driver coils comprising a bar-like magnet adapted to oscillate about a point intermediate its ends and having at one end a single pole of one type and at the other end having two axially aligned poles, one of each type and of equal strength, said one end of the magnet being adapted for linking with a single coil past which said one end moves whereas said other end will not link with said single coil, said other end of the magnet being adapted to link with each of two coils past which the respective ones of said two poles move whereas said one end will not link with said two coils.

9. A magnet for use in an electric clockwork for cooperation with excitation and driver coils comprising a bar-like magnet adapted to oscillate about a point intermediate its ends and having at one end a single pole of one type and at the other end having two poles, one of each type and of equal strength, said two poles being located in a common axial plane.

10. A magnet for use in an electric clockwork for cooperation with excitation and driver coils comprising a bar-like magnet adapted to oscillate about a point intermediate its ends and having at one end a single pole of one type and at the other end having two poles, one of each type and of equal strength, said two poles being spaced apart in the direction of the axis of oscillation of said magnet, and being located in a common axial plane.

References Cited
UNITED STATES PATENTS 1,997,193  4/1935  Kato et al. _____ 310—151

FOREIGN PATENTS 829,191  3/1960  Great Brtiain.
352,969  4/1961  Switzerland.

MILTON O. HIRSHFIELD, *Primary Examiner.*

D. F. DUGGAN, *Assistant Examiner.*